United States Patent [19]

Andrä et al.

[11] Patent Number: 4,650,168

[45] Date of Patent: Mar. 17, 1987

[54] ELASTIC ENGINE MOUNT WITH HYDRAULIC DAMPING

[75] Inventors: Rainer Andrä, Limburg; Manfred Hofmann, Hünfelden, both of Fed. Rep. of Germany

[73] Assignee: Metzeler Kautschuk GmbH, Munich, Fed. Rep. of Germany

[21] Appl. No.: 802,737

[22] Filed: Nov. 29, 1985

[30] Foreign Application Priority Data

Nov. 29, 1984 [DE] Fed. Rep. of Germany ....... 3443619

[51] Int. Cl.$^4$ .............................................. F16F 9/08
[52] U.S. Cl. ................................................ 267/140.1
[58] Field of Search ............... 248/562; 267/8 R, 113, 267/140.1, 141

[56] References Cited

U.S. PATENT DOCUMENTS

| | | | |
|---|---|---|---|
| 2,683,016 | 7/1954 | Campbell | 267/140.1 |
| 2,919,883 | 1/1960 | Murphy | 267/140.1 |

Primary Examiner—Duane A. Reger

Attorney, Agent, or Firm—Herbert L. Lerner; Laurence A. Greenberg

[57] ABSTRACT

An elastic engine mount with hydraulic damping includes a working chamber having an end, a compensating chamber, an intermediate plate disposed between the chambers having an annular channel formed therein interconnecting the chambers, a conical shell-shaped elastomer wall partially defining the working chamber, a bearing plate connected to the elastomer wall and bordering the end of the working chamber, a projecting cylindrical ring in the form of a tension and compression stop extending from the bearing plate into the working chamber and having an expanded free end in the form of an inwardly-disposed, radially-outwardly extending rim, a substantially cup-shaped stop ring gripping the expanded free end of the cylindrical ring, the stop ring having an axially-directed region with elongated radial through holes formed therein, and a rubber membrane disposed inside the cylindrical ring covering the cross section inside the cylindrical ring and closing off an air-filled membrane chamber.

3 Claims, 1 Drawing Figure

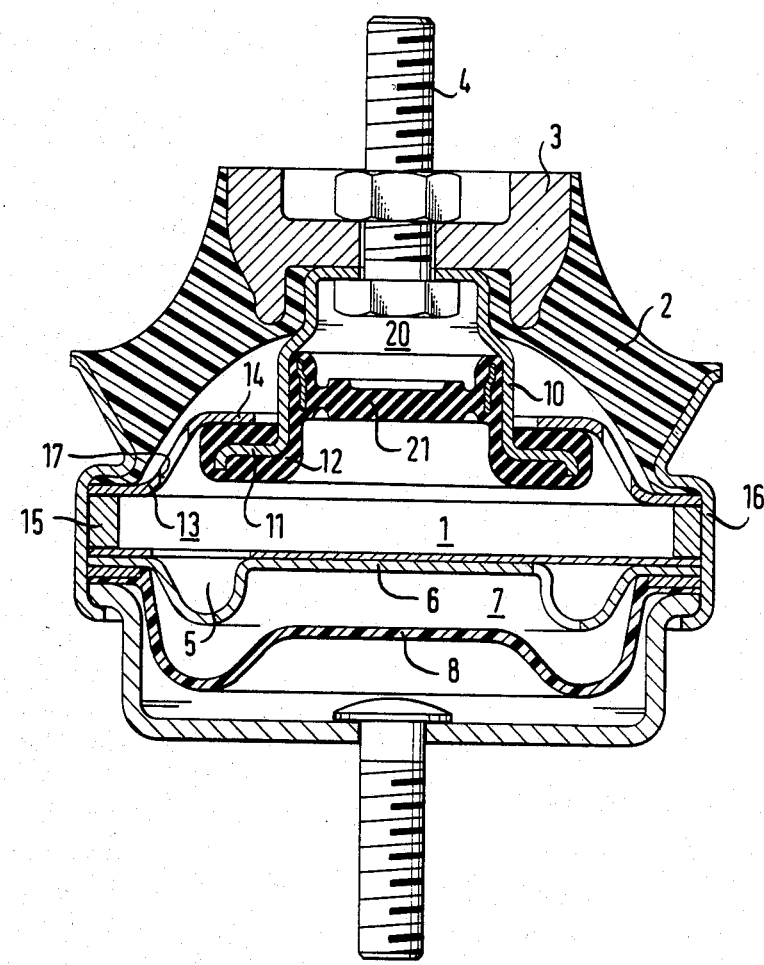

ELASTIC ENGINE MOUNT WITH HYDRAULIC DAMPING

The invention relates to an elastic engine mount with hydraulic damping, especially for motor vehicles, including a working chamber defined by a conical shell-shaped elastomer wall, a bearing plate bordering an end of the working chamber, the working chamber being in communication with a compensating chamber through an annular channel formed in an intermediate plate, and a projection extending from the bearing plate into the working chamber, the projection being expanded at a free end thereof and being formed as a tension and compression stop, the expanded end thereof being gripped from behind by an approximately cup-shaped stop ring.

An engine mount of this type is known from German Published, Non-Prosecuted Application DE-OS No. 32 39 787.

In that device, the ring which projects from the bearing plate into the working chamber is a saucer-shaped disc, which leans against the conical shell-shaped rubber-elastic chamber wall when loaded by tension and thus represents a stop with progressive spring action in the tension or pulling direction.

In the case of high loads, such as loads that occur in front wheel drive vehicles due to the very high torques, a stop of this type may not be sufficient. This is because although all of the tension forces are transferred to the chamber wall which acts as the supporting spring, this rubber body has to absorb all tension loads that are applied by itself.

It is accordingly an object of the invention to provide an elastic engine mount with hydraulic damping, which overcomes the hereinafore-mentioned disadvantages of the heretofore-known devices of this general type and which provides an effective limiting stop without the danger of the upper bearing plate being ripped off, even upon the occurrence of sudden tensional loads.

With the foregoing and other objects in view there is provided, in accordance with the invention, an elastic engine mount with hydraulic damping, comprising a working chamber having an end, a compensating chamber, an intermediate plate disposed between the chambers having an annular channel formed therein interconnecting the chambers, a conical shell-shaped elastomer wall partially defining the working chamber, a bearing plate connected to the elastomer wall and bordering the end of the working chamber, a projecting cylindrical ring in the form of a tension and compression stop extending from the bearing plate into the working chamber and having an expanded free end in the form of an inwardly-disposed, radially-outwardly extending rim, a substantially cup-shaped stop ring gripping the expanded free end of the cylindrical ring, the stop ring having an axially-directed region with elongated radial through holes formed therein, and a rubber membrane disposed inside the cylindrical ring covering the cross section inside the cylindrical ring and closing off an air-filled membrane chamber.

In accordance with another feature of the invention, the stop ring has an outer rim clamped against the imtermediate plate.

This type of a mechanical stop ensures that even very high tension forces, which can be as high as 1000 kg, can be reliably absorbed and controlled.

In accordance with a concomitant feature of the invention the rim of the cylindrical ring has upper and lower surfaces, and including a rubber layer on the upper and lower surfaces of the rim being integrally merged with a radially outer region of the rubber membrane. The rubber layer is provided for padding.

The stop ring is provided with holes for the passage of fluid in order to avoid fluid being trapped in the upper chamber part upon the occurrence of a tension load.

Closing the inner space of the ring with a rubber elastic membrane produces a counter-phase quenching effect in order to avoid a dynamic stiffening of the engine mount.

The advantage of the invention is as follows. The tension and compression stop is formed in such a way that it can simultaneously receive a membrane for acoustical adjustment and can make it possibe to damp radial vibrations due to a possible radial cross flow.

Other features which are considered as characteristic for the invention are set forth in the appended claims.

Although the invention is illustrated and described herein as embodied in an elastic engine mount with hydraulic damping, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the single FIGURE of the drawing, which is a longitudinal-sectional view of an engine mount or motor support according to the invention.

Referring now to the FIGURE of the drawing in detail, there is seen a hydraulically damped engine mount or motor support which has a working chamber 1 closed at the top thereof by a conical shell-shaped elastomer wall 2 and by a bearing or support plate 3 with a connection bolt or stud 4. The working chamber is in communication with a compensating chamber 7 through an annular channel 5 formed in an intermediate plate 6. The compensating chamber 7 is closed by an elastic bellows 8.

The bearing plate 3 is provided at the inner surface thereof with a projecting cylindrical ring 10 in the form of a tension and compression stop, which projects into the working chamber 1. The ring 10 has a radially outwardly extending edge or rim 11. This rim 11 can be provided with a rubber layer 12 on the upper and lower surfaces thereof.

An approximately conical shell-shaped or cup-shaped stop ring 13 is disposed concentrically to the ring 10, so that the inner rim 14 of the stop ring 13 reaches behind the upper surface of the radial rim 11 of ring 10. The outer edge of the stop ring 13 is clamped against the intermediate plate 6 by an outer housing 16, in some cases with the interposition of a spacer ring 15.

Upon the occurrence of a sudden tension load and a spring reaction of the engine mount, the upper surface of the rim 11 of the ring 10 or the rubber layer 12 hits against the stop ring 13, so that a rigid mechanical travel limitation is assured for motion in the tension direction.

In the illustrated embodiment which is used as an example, the engine mount is shown in the state when a pulling force is applied and the corresponding contact with the stop ring takes place. In order to assure a free fluid passage from the space above the stop ring 13 into the actual working chamber 1, the stop ring 13 is provided with additional holes 17.

The inner space of the ring 10 at the support plate side can therefore be closed off with a rubber elastic membrane 21, which at the same time encloses a corresponding air cushion 20, which acts as a quenching mass at higher frequencies with smaller amplitudes. It can be seen that the radially outer region of the rubber membrane 21 is integral with the rubber layer 12 on the rim 11.

The above-described construction of the engine mount guarantees that even high and sudden tension loeds can be reliably absorbed, without the danger of damaging or destroying the engine mount.

We claim:

1. Elastic engine mount with hydraulic damping, comprising a working chamber having an end, a compensating chamber, an intermediate plate disposed said chambers having an annular channel formed therein interconnecting said chambers, a conical shell-shaped elastomer wall partially defining said working chamber, a bearing plate connected to said elastomer wall and bordering said end of said working chamber, a projecting cylindrical ring in the form of a tension and compression stop extending from said bearing plate into said working chamber and having an expanded free end in the form of an inwardly-disposed, radially-outwardly extending rim, a substantially cup-shaped stop ring gripping said expanded free end of said cylindrical ring, said stop ring having an axially-directed region with elongated radial through holes formed therein, and a rubber membrane disposed inside said cylindrical ring covering the cross section inside said cylindrical ring and closing off an air-filled membrane chamber.

2. Elastic engine mount according to claim 1, wherein said rim of said cylindrical ring has upper and lower surfaces, and including a rubber layer on said upper and lower surfaces of said rim being integrally merged with a radially outer region of said rubber membrane.

3. Elastic engine mount according to claim 1, wherein said stop ring has an outer rim clamped against said intermediate plate.

* * * * *